(12) United States Patent
Putnam

(10) Patent No.: US 6,728,057 B2
(45) Date of Patent: Apr. 27, 2004

(54) FREQUENCY EXTENSION METHOD AND APPARATUS FOR FAST RISE TIME WRITERS

(75) Inventor: John S. Putnam, Excelsior, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 266 days.

(21) Appl. No.: 09/801,019

(22) Filed: Mar. 7, 2001

(65) Prior Publication Data

US 2001/0046102 A1 Nov. 29, 2001

Related U.S. Application Data

(60) Provisional application No. 60/202,890, filed on May 10, 2000.

(51) Int. Cl.[7] ............................. G11B 5/02; G11B 5/09
(52) U.S. Cl. ........................... 360/68; 360/67; 360/46
(58) Field of Search ...................... 360/46, 67–68, 360/78.04, 128; 326/30, 82; 333/201, 176, 205

(56) References Cited

U.S. PATENT DOCUMENTS

| 3,796,945 A | * | 3/1974 | Feldman et al. ............. 381/101 |
| 5,337,198 A |   | 8/1994 | Nishiyama et al. ........... 360/65 |
| 5,357,379 A |   | 10/1994 | Gower ......................... 360/46 |
| 5,608,591 A |   | 3/1997 | Klaassen ..................... 360/104 |
| 5,717,547 A | * | 2/1998 | Young ......................... 360/246 |
| 5,912,779 A |   | 6/1999 | Llewellyn et al. ............. 360/55 |
| 6,014,281 A | * | 1/2000 | Contreras ..................... 360/67 |
| 6,147,576 A | * | 11/2000 | Arevalo ....................... 333/204 |
| 6,331,919 B1 | * | 12/2001 | Klaassen et al. .............. 360/46 |
| 6,356,113 B1 | * | 3/2002 | Contreras et al. ............. 326/82 |
| 6,424,505 B1 | * | 7/2002 | Lam et al. .................... 360/323 |
| 2001/0036028 A1 | * | 11/2001 | Putnam et al. ................. 360/46 |

OTHER PUBLICATIONS

Klaassen et al., "High Speed Magnetic Recording", Jul. 1998, IEEE Transactoins on Magnetics, vol. 34; No. 4, pp. 1822–1827.*

"Electroplated Cobalt Alloys as Perpendicular Media Magnetic Storage", Feb. 1990, IBM Technical Disclosure Bulletin, vol. 32; No. 9B, pp. 416–418.*

* cited by examiner

*Primary Examiner*—David Hudspeth
*Assistant Examiner*—Natalia Figueroa
(74) *Attorney, Agent, or Firm*—Westman, Champlin & Kelly

(57) ABSTRACT

A disc drive storage system and device is provided in which distortion in a drive signal due to a mismatch between a signal source impedance and a write head impedance is minimized. A write head that writes on a disc surface and a signal source that provides a drive signal to the write head are coupled by an electrical interconnect path. A connection device that minimizes the mismatch between the signal source impedance and the write head impedance is introduced in the electrical interconnect path. In addition, a method of coupling a signal source to a write head in a disc drive storage system is provided.

16 Claims, 13 Drawing Sheets

FREQUENCY EXTENSION METHOD AND APPARATUS FOR FAST RISE TIME WRITERS

CROSS-REFERENCE TO RELATED APPLICATION

This application claims priority to U.S. Provisional Application No. 60/202,890, filed May 10, 2000, and entitled "FREQUENCY EXTENSION FOR FAST RISE TIME WRITERS".

FIELD OF THE INVENTION

The present invention relates to data storage systems and, in particular, to a frequency range extension technique for flex-on-suspension (FOS) equipped magneto-resistive (MR) read/write head assembly.

BACKGROUND OF THE INVENTION

In disc drives and other data storage systems, digital data are written to and read from data storage surfaces. Read and write operations are performed through a transducer which is typically carried on a slider body. The slider and the transducer are sometimes collectively referred to as a head, and typically a single head is associated with each data storage surface. Data are stored by magnetizing the disc storage surface in one of two possible orientations to indicate either a logic 0 or a logic 1. This is referred to as a "write" operation. When writing data, the head (sometimes referred to as the write head) carries a current which creates a magnetizing force large enough to saturate the magnetic medium. This write current is provided by a write current source which is coupled to the head through an electrical interconnect path. The source, head and interconnect path together form a write circuit. The write circuit keeps the current constant when a logic 0 is written on the disc, and when writing a logic 1, the write circuit reverses the polarity of the current to switch the orientation of the magnetization on the disc.

In any transmission system such as the write circuit, a source sends energy to a load. Ideally, the transmission network should have impedances of the source, the transmission line and the load, all identical. Unfortunately, many real-world situations prevent the match from being perfect. Typically, a mismatch exists between the source impedance and the impedance of the head (load impedance) in the write circuit. Maximum power transfer occurs in a circuit when the load impedance equals the source impedance of the driving waveform. When the source and load impedance are not equal and there is distance between the two impedances, some portion of the energy intended to be delivered to the load will be reflected back toward the source causing signal distortion. This is a typical problem in digital circuit board design and the phenomenon exhibits itself more and more as signal bandwidths become significant relative to the circuit distances involved. As the data transfer rates in disc drives increase, the write waveform rise time will decrease. As the rise time decreases, the signal bandwidth occupied by the write waveform increases. The wave length of the higher order harmonics of the write waveform are now short enough, relative to the signal path length, that the reflected energy from the write head will have an opportunity to distort the write waveform. Energy is reflected back from the head due to an impedance mismatch from the head and through the impedance of the interconnect path to the source impedance.

One remedy to this problem is to place the source (read/write interface) closer to the head thereby shortening the distances involved such that the reflection phenomenon is negligible. However, this solution comes at the cost of one read/write interface per head and replication of the associated interconnect and support circuitry required for each read/write interface as opposed to a single multi-channel read/write interface mounted on a single supporting circuit addressing a multitude of heads as used in current products.

The present invention addresses these problems, and offers other advantages over the prior art.

SUMMARY OF THE INVENTION

The present invention relates to data storage systems that have a connection device which solves the above-mentioned problem.

A disc drive storage system and device is provided in which distortion in a drive signal due to a mismatch between a signal source impedance and a write head impedance is minimized. A write head that writes on a disc surface and a signal source that provides a drive signal to the write head are coupled by an electrical interconnect path. A connection device that minimizes the mismatch between the signal source impedance and the write head impedance is introduced in the electrical interconnect path. In addition, a method of coupling a signal source to a write head in a disc drive storage system is provided.

These and various other features as well as advantages which characterize the present invention will be apparent upon reading of the following detailed description and review of the associated drawings.

BRIEF DESCRIPTION OF THE DRAWINGS

FIG. 2-1 is a simplified block diagram of a prior art write circuit.

FIG. 2-2 is a plot of head impedance measurements for a 20 nH head using frequencies ranging from 50 MHz to 2 GHz.

FIG. 2-3 is a plot of impedance looking through an FOS interconnect path with a 20 nH head at the far end, using frequencies ranging from 30 KHz to 2 GHz.

FIG. 2-4 is a plot of impedance looking through an FOS interconnect path with an ideal termination of 104 ohms using frequencies ranging from 30 KHz to 2 GHz.

FIG. 3 is a simplified block diagram of a write circuit including a connection device in accordance with the present invention.

FIGS. 4-1 and 4-2 are schematic circuit diagrams illustrating embodiments of the present invention that include a Pi type attenuator as the connection device.

FIGS. 5-1 and 5-2 are schematic circuit diagrams illustrating embodiments of the present invention that include a T type attenuator as the connection device.

FIGS. 6-1 and 6-2 are schematic circuit diagrams illustrating embodiments of the present invention that include an L type attenuator as the connection device.

FIG. 7-1 illustrates a schematic used for simulation of a head and FOS interconnect path.

FIG. 7-2 is a plot of impedance looking through the FOS interconnect path of FIG. 7-1.

FIG. 8-1 illustrates the simplified model of a write circuit with a −3 dB attenuator included in the FOS interconnect path.

FIG. 8-2 is a plot of impedance looking through the FOS interconnect path of FIG. 8-1.

FIG. 9-1 illustrates the simplified model of a write circuit with a −6 dB attenuator included in the FOS interconnect path.

FIG. 9-2 is a plot of impedance looking through the FOS interconnect path of FIG. 9-1.

DETAILED DESCRIPTION OF ILLUSTRATIVE EMBODIMENTS

Figure 1:
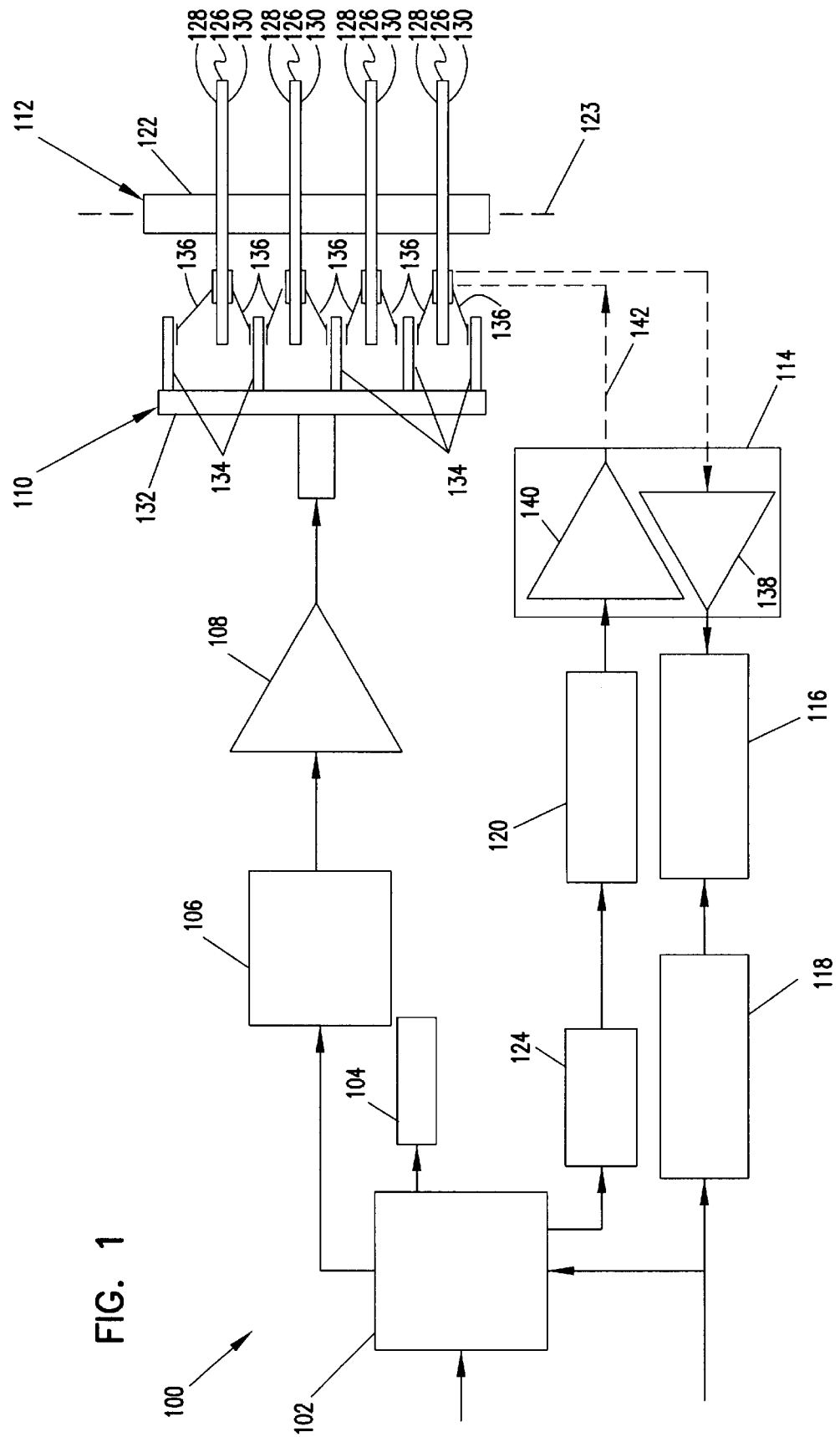
FIG. 1 is a block diagram of a disc drive with which the present invention is useful.

Referring now to FIG. 1, a block diagram of disc drive 100 with which the present invention is useful is shown. The same reference numerals are used in the various figures to represent the same or similar elements. Disc drive 100 includes drive controller 102, memory 104, servo control processor 106, power amplifier 108, actuator assembly 110, disc stack assembly 112, read/write interface 114, data and clock recovery circuit 116, error detection circuit 118, write precompensation circuit 120, and encoder 124.

Drive controller 102 is typically a microprocessor, or digital computer, and is coupled to a host system, or another drive controller which controls a plurality of drives. Drive controller 102 operates based on programmed instructions stored in memory 104 and received from the host system.

Disc stack assembly 112 includes spindle 122 which supports a plurality of coaxially arranged discs 126. Discs 126 are mounted for rotation with spindle 122 about an axis of rotation 123. Each of the discs 126 has a first surface 128 and a second surface 130. Surfaces 128 and 130 include concentric tracks for receiving and storing data in the form of magnetic flux reversals encoded on the tracks. A group of tracks includes one track per surface 128 and 130, and is referred to as a cylinder. Each track in the group is located at a common radial distance from the inner diameter of the corresponding disc 126 upon which it resides.

Actuator assembly 110 includes an actuator 132 supporting a plurality of actuator arms 134. Each of the actuator arms 134 is rigidly coupled to at least one head-gimbal assembly 136. Each head-gimbal assembly includes a load beam, or flexure arm, rigidly coupled to actuator arm 134 at a first end thereof, and to a gimbal at a second end thereof. The gimbal is, in turn, coupled to a hydrodynamic bearing, such as an air bearing, which supports a transducer head above the corresponding disc surface 128 or 130, for accessing data within the tracks on the disc surface.

Actuator 132 is rotatably mounted with respect to discs 126. As actuator 132 rotates, it moves the transducer heads coupled to the head-gimbal assemblies 136 either radially inward, toward an inner radius of the corresponding disc 126, or radially outward, toward an outer radius of the corresponding disc 126. In this way, actuator 132 positions the transducer heads on head-gimbal assemblies 136 over a desired track (and cylinder) on the discs 126.

In operation, drive controller 102 typically receives a command signal from the host system which indicates that a certain portion of a disc 126 on disc stack assembly 112 is to be accessed. In response to the command signal, drive controller 102 provides servo control processor 106 with a position signal which indicates a particular cylinder over which actuator 132 is to position head-gimbal assemblies 136. Servo control processor 106 converts the position signal into an analog signal which is amplified by power amplifier 108 and provided to actuator assembly 110. In response to the analog position signal, actuator 132 positions head-gimbal assemblies 136 over the desired cylinder.

The command signal from drive controller 102 also indicates the particular sector to be read from or written to. If the particularly identified disc and sector are to be read, the data head on the corresponding head-gimbal assembly 136 generates a read signal in response to the stored magnetic flux reversals. The data head provides the read signal to read/write interface 114. Read/write interface 114 includes a preamplifier 138 which amplifies the read signal and provides it to data and clock recovery circuit 116. Data and clock recovery circuit 116 recovers the data which is encoded on the disc surface when the data is written to the disc surface. Data and clock recovery circuit 116 operates in a known manner. Once the data is recovered, it is provided to error detection circuit 118 which detects whether any errors have occurred in the data read back from the disc.

During a write operation, the host system provides drive controller 102 with a command signal which indicates the amount of data to be stored and the particular data tracks and sectors at which the data is to be stored. The host system also transfers the data to be stored to a buffer in memory 104 so the data can be accessed by drive controller 102. Drive controller 102 provides the data to encoder 124. Encoder 124 encodes the data into a serial train of write pulses representing magnetic flux reversals to be written on the disc surfaces 128 and 130. Encoder 124 operates in a known manner.

Write precompensation circuit 120 modifies the serial train of write pulses by performing an operation known as a non-linear or pattern dependent transition shift. Write precompensation circuit 120 shifts the relative position of the write pulses to properly space the flux reversals on the disc surfaces 128 and 130. Write precompensation circuit 120 also operates in a known manner.

The write pulses are then passed to a write amplifier circuit 140 within read/write interface 114 which directs current through electrical interconnect path 142 and the transducer head (not shown) in one of two directions as a function of the write pulses. Typically, electrical interconnect path 142 includes a flex circuit or FOS instead of individual wires.

Figures 1, 2:
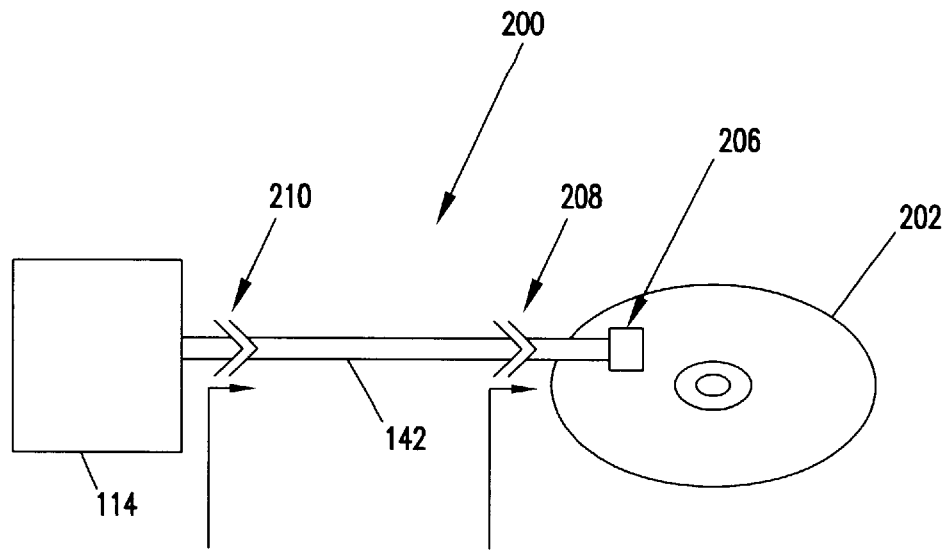

Referring now to FIG. 2-1, a simplified block diagram of a prior art write circuit 200 is shown. For ease of illustration, only one disc 202 of multiple discs 126 (of FIG. 1) is shown. Prior art write circuit 200 includes signal source or read/write interface 114. Also included are electrical interconnect path 142 and transducer head 206 that writes on a surface of disc 202. Electrical interconnect path 142 provides an electrical transmission medium for a drive waveform from signal source 114 to transducer head 206. A mismatch exists between the impedance of signal source 114 and the impedance of transducer head 206 of prior art write circuit 200. Consequently, prior art write circuit 200 suffers from the adverse effects of signal reflection from transducer head 206 to signal source 204, thereby causing distortion in the drive signal waveform. Impedance of transducer head 206 is measured from first measurement point 208 and second measurement point 210 along interconnect path 142 to analyze impedance characteristics of prior art write circuit 200.

Figure 3:
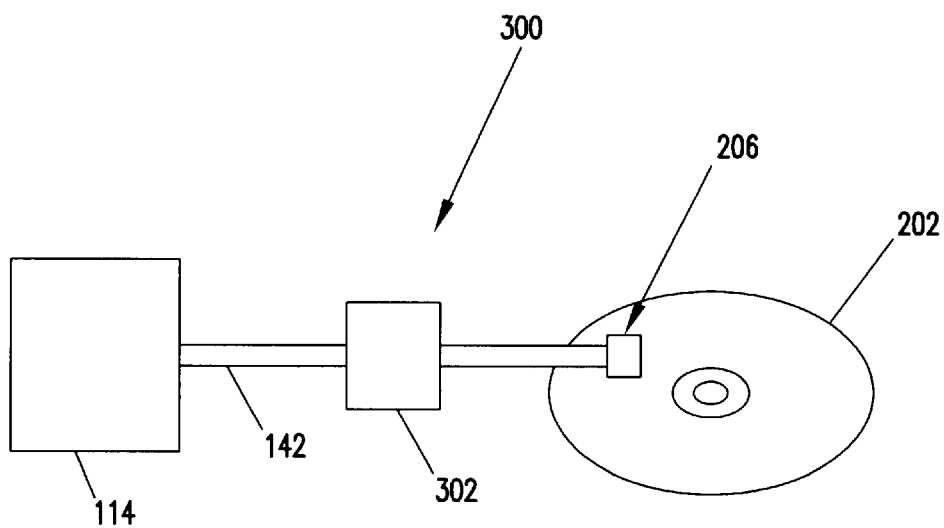

Referring now to FIG. 2-2, a first impedance plot 212 of the impedance of transducer head 206 at first measurement point 208 (of FIG. 2-1) is shown. First impedance plot 212 is depicted on a Smith Chart (chart derived from a relationship between a complex reflection coefficient and complex impedance) and represents impedance variation for a 20 nH head using frequencies ranging from 50 MHz to 2 GHz. FIG. 2-3 shows a second impedance plot 214 of impedance of transducer head 206 looking from second measurement point 210 of FIG. 2-1. Second impedance plot 214 represents impedance variation for a 20 nH head using frequencies ranging from 30 KHz to 2 GHz looking from second measurement point 210.

Figure 2:
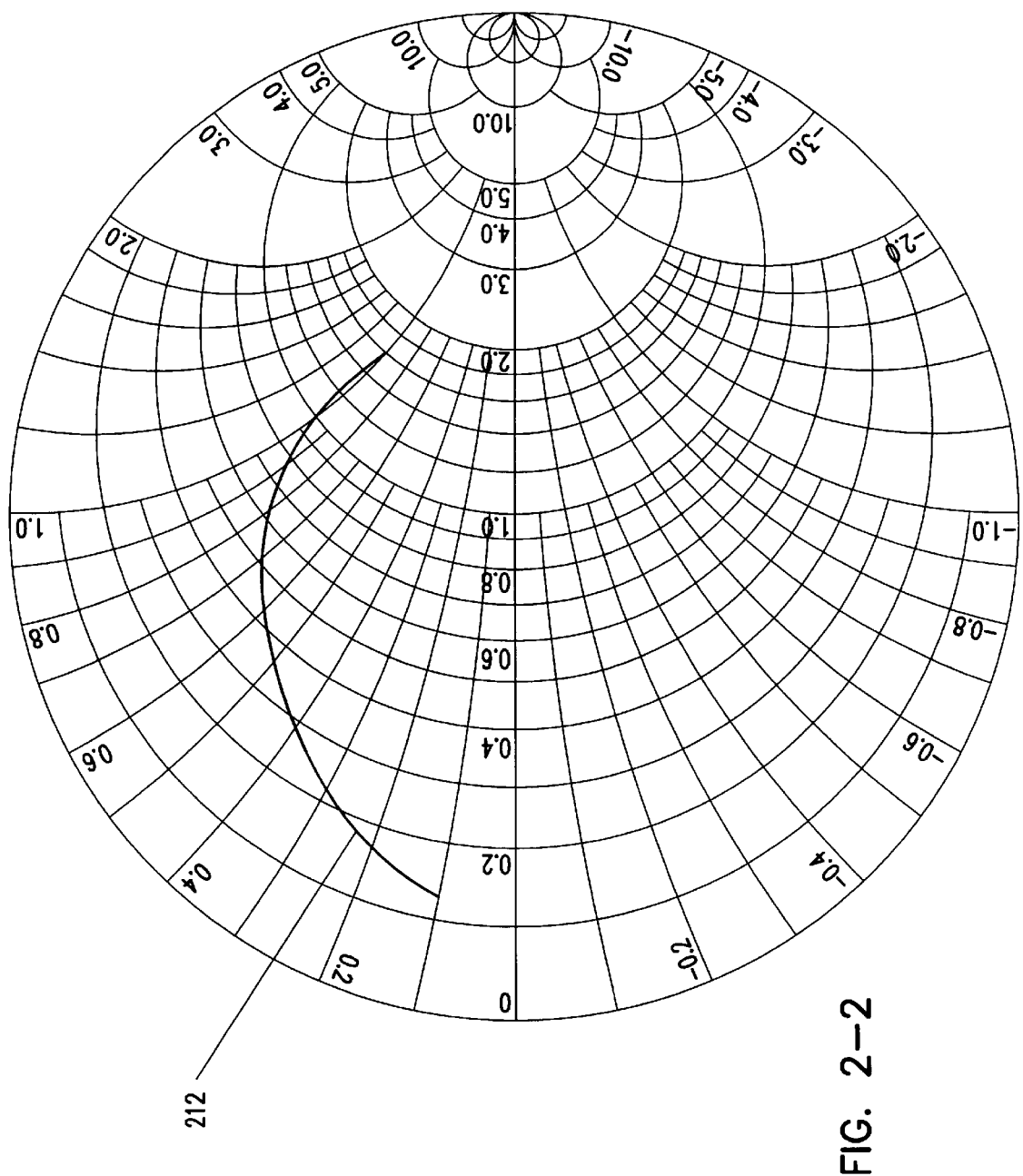
Figures 2, 3:
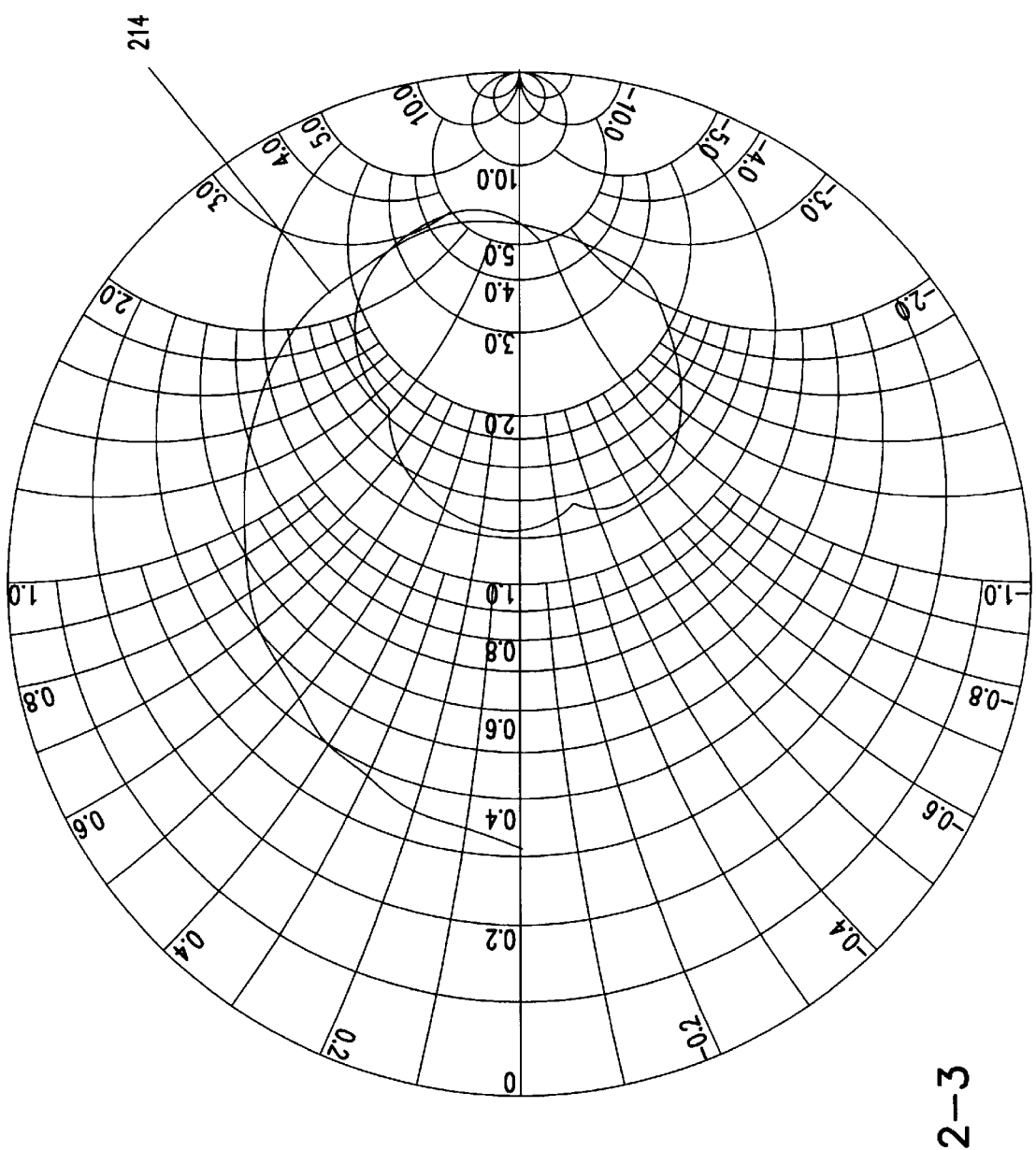
Figures 2, 3, 4:
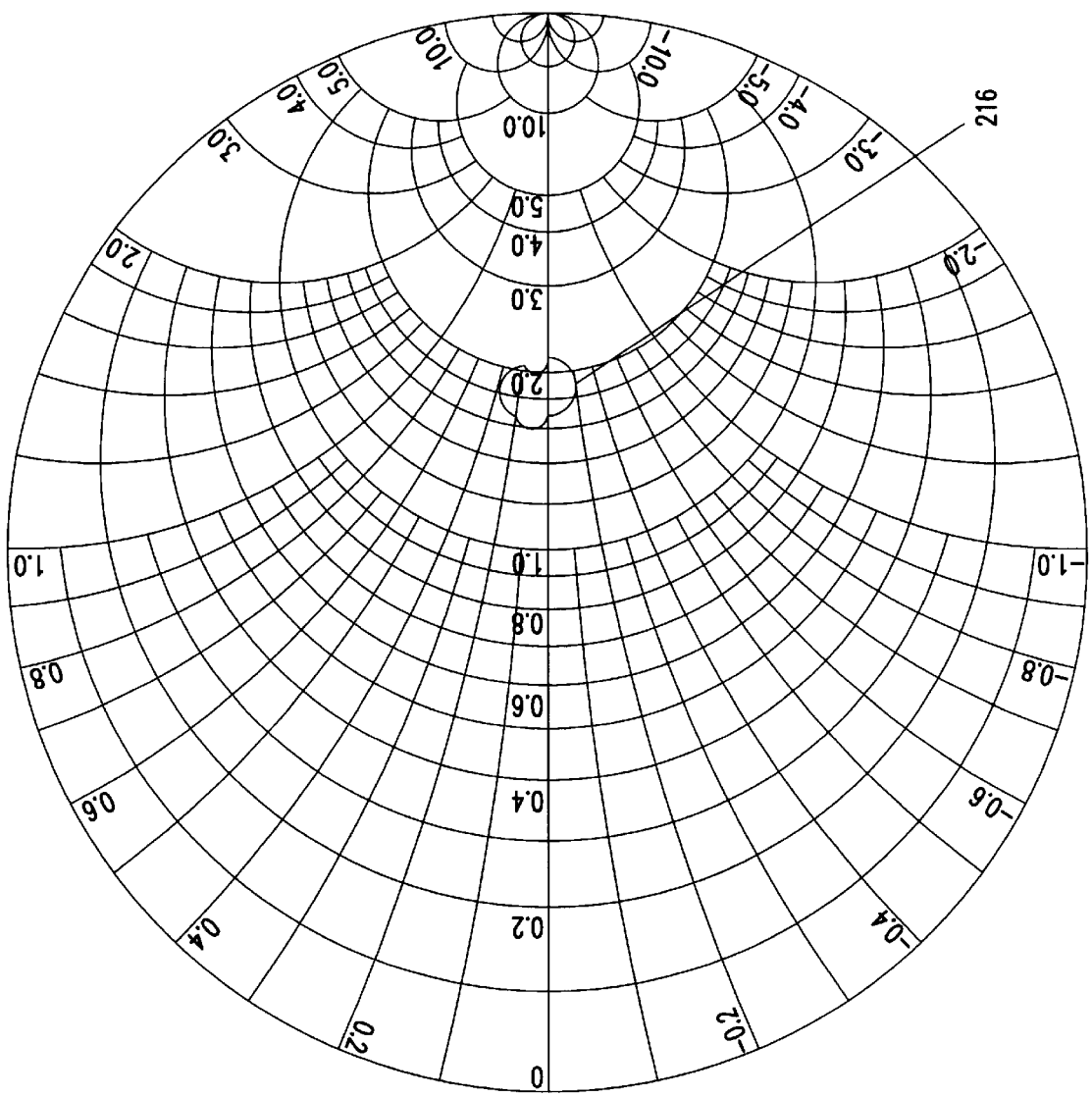
Figures 1, 4:
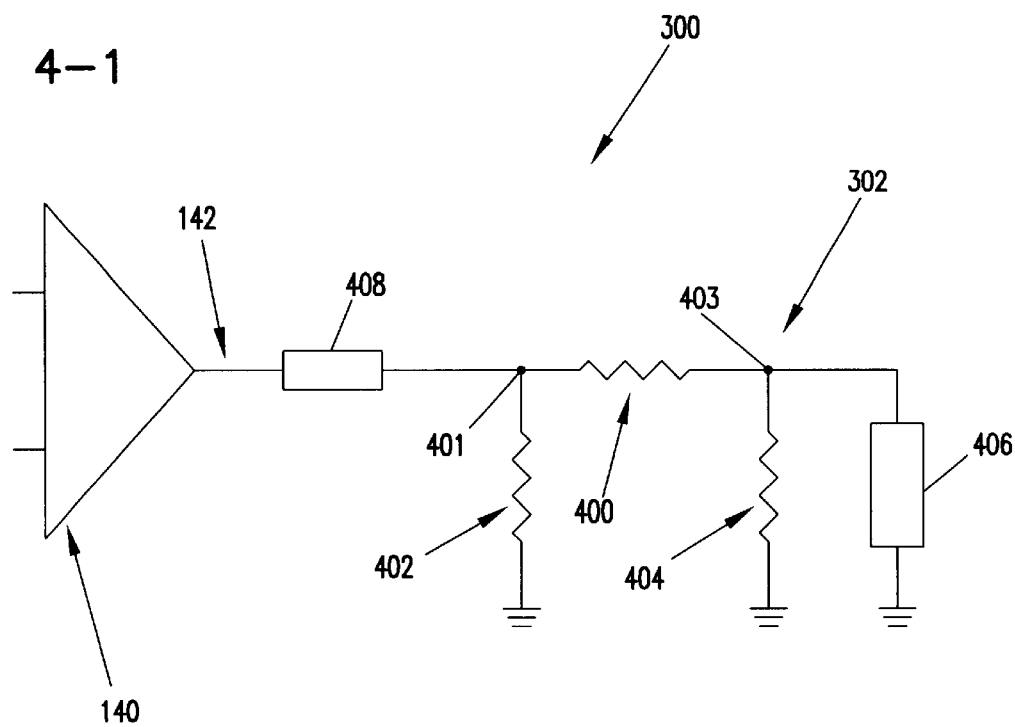
Figures 2, 4:
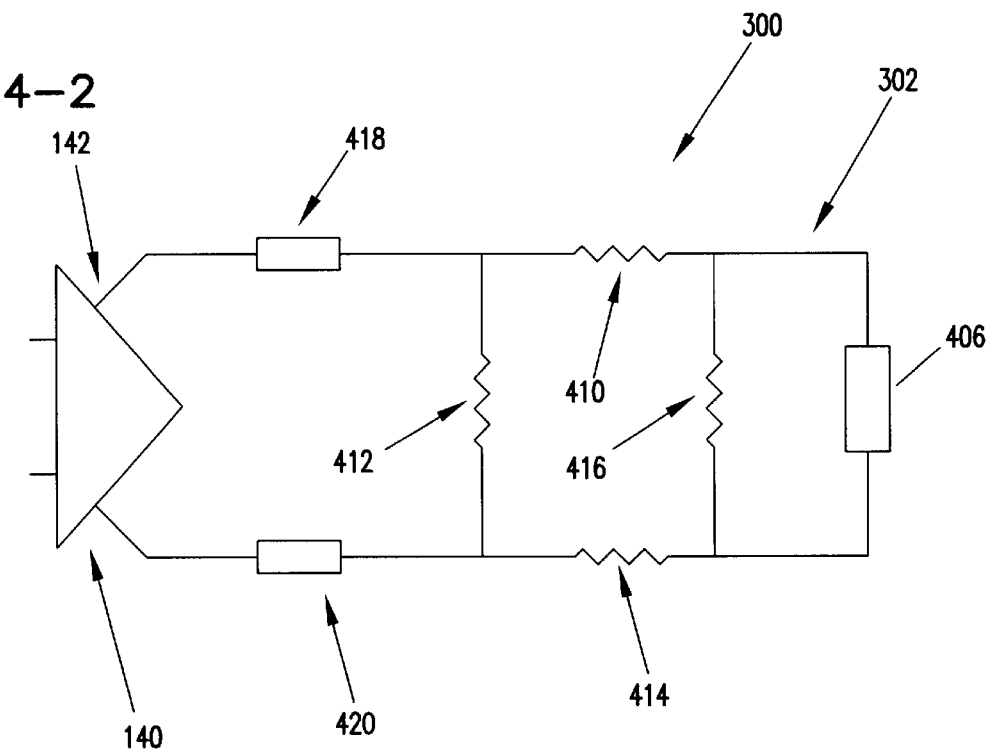

Impedance variation as a function of frequency is also referred to as the voltage standing wave ratio (VSWR). Constant VSWR is depicted as a circle around the Smith Chart, once around is a half wavelength. The smaller the circle is, the lower the VSWR, the better the impedance match. FIG. 2-4 shows a third impedance plot 216 of impedance looking through an FOS interconnect path with close to ideal termination of 104 ohms. Third impedance plot 216 is very small circle indicating a small VSWR. A goal of the present invention is to achieve an impedance match that produces VSWR characteristics close to those shown in FIG. 2-4.

Referring now to FIG. 3, a simplified block diagram of a matched write circuit 300 including a connection device 302 in accordance with the present invention is shown. Matched write circuit 300 is similar to prior art write circuit 200 (of FIG. 2-1) with the addition of connection device 302 introduced in interconnect path 142. Connection device 302 helps match the impedance of transducer head 206 and signal source 114 to minimize reflection of the signal that causes some energy that was intended to be delivered to the load to be reflected back to the source.

Referring now to FIG. 4-1, a schematic circuit diagram illustrating a Pi type attenuator as connection device 302 is shown. The circuit of FIG. 4-1 is single-ended as it responds to the voltage between one input terminal and ground. An amplified drive signal is provided by write amplifier 140. The Pi-type attenuator is shown as connection device 302 included between interconnect path impedance 408 and head (load) impedance 406. The Pi-type attenuator includes resistors 400, 402 and 404, with resistor 400 connected in series between interconnect path impedance 408 and head impedance 406. Resistor 402 is connected between node 401 and ground and resistor 404 is connected between node 403 and ground. Values of these resistors are chosen to provide a match for source and load impedance so as to reduce the frequency sensitivity of the circuit and the frequency dependency of interconnect path 142. Write amplifier 140 provides increased signal amplitude to compensate for attenuation of the drive signal caused by the introduction of resistors 400, 402 and 404 in interconnect path 142. FIG. 4-2 also incorporates a Pi type attenuator as the connection device 302 but unlike the single ended circuit of FIG. 4-1 this is a differential circuit that uses four resistors 410, 412, 414 and 416 to implement a Pi type attenuator. A differential circuit actively responds to the difference between two terminals rather than the difference between one terminal and ground. Therefore, matched write circuit 300 includes interconnect path impedances 418 and 420 connected to each terminal of write amplifier 140.

Figures 1, 5:
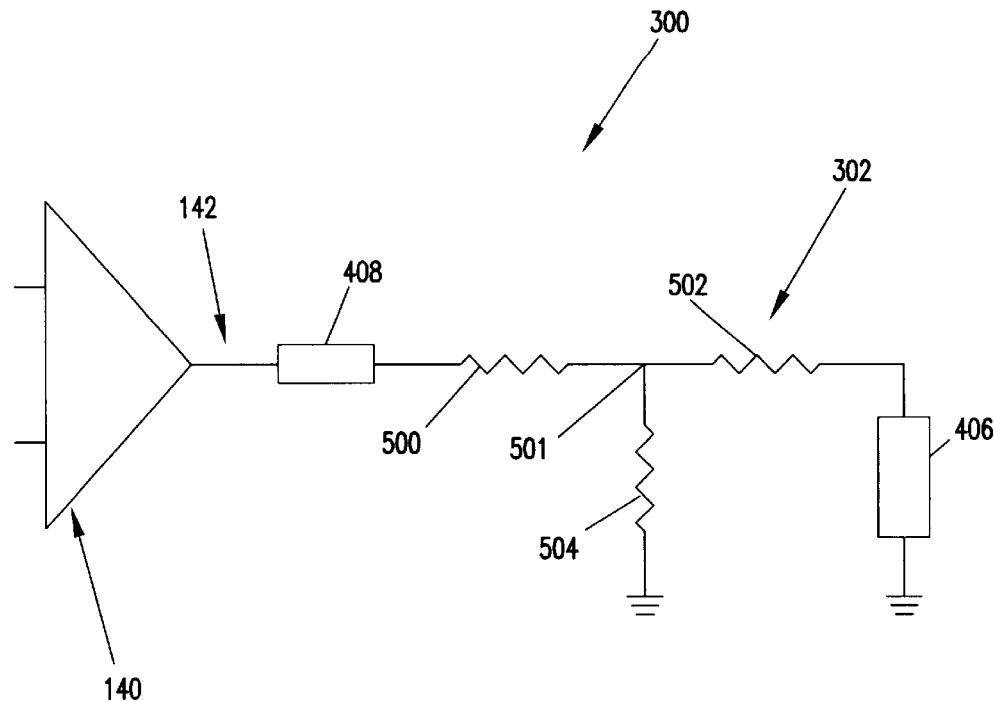
Figures 2, 5:
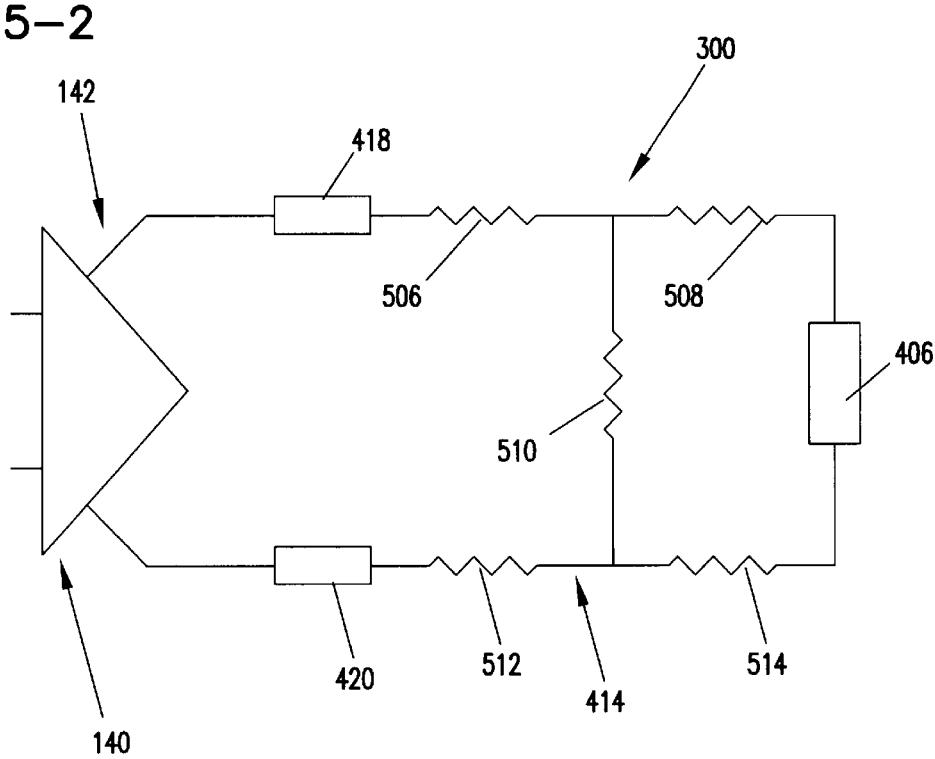

Referring now to FIG. 5-1, a schematic circuit diagram illustrating a T type attenuator as connection device 302 is shown. As in FIGS. 4-1 and 4-2 an amplified drive signal is provided by write amplifier 140. Resistor 500 and 502 are connected in series between interconnect path impedance 408 and load impedance 406. Resistor 504 is connected between node 501 (positioned between resistors 500 and 502) and ground. FIG. 5-2 also shows a T type attenuator as connection device 302 for a differential circuit that uses five resistors 506, 508, 510, 512 and 514 to implement a T type attenuator. The T type attenuators also produce impedance matching results similar to those achieved by the Pi type attenuators of FIGS. 4-1 and 4-2.

Figures 1, 6:
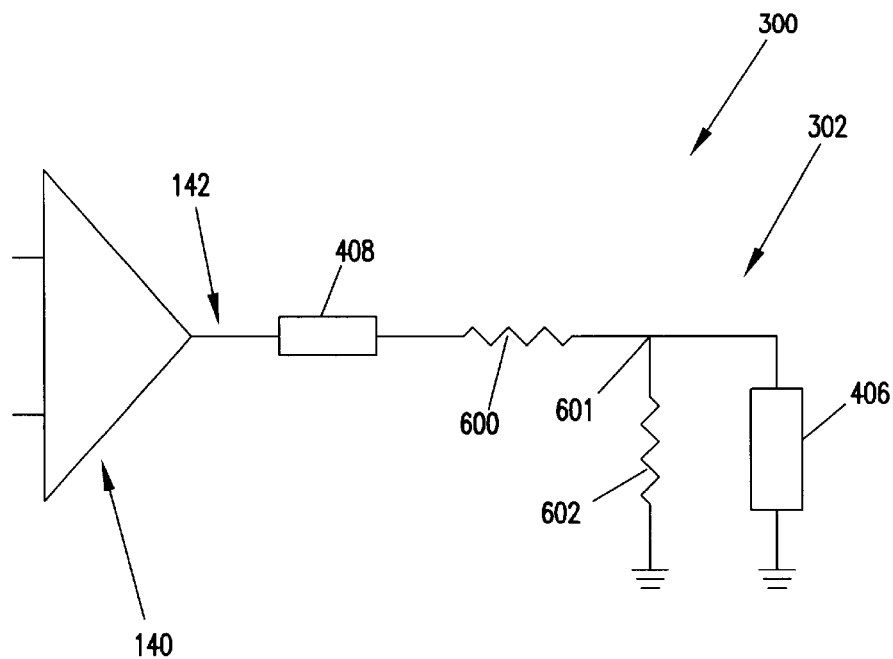
Figures 2, 6:
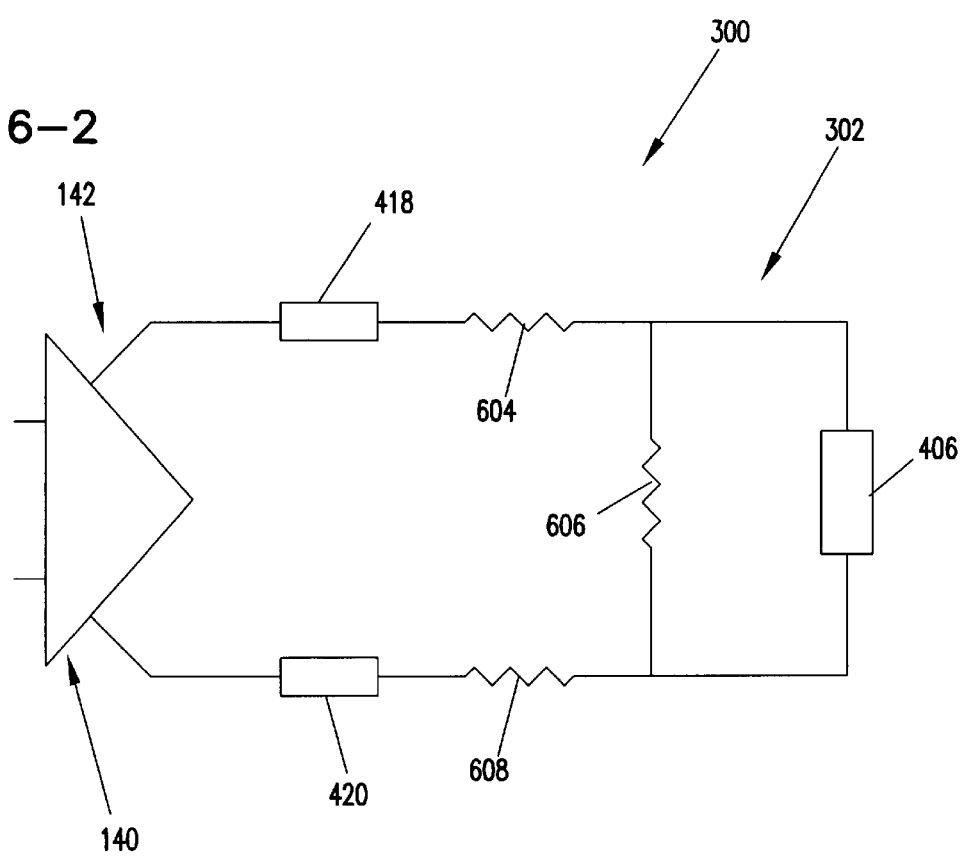

Referring now to FIG. 6-1 a schematic circuit diagram illustrating an L type attenuator as connection device 302 is shown. An amplified drive signal is provided by write amplifier 140. The L type attenuator includes resistor 600 connected in series in interconnect path 142 between interconnect path impedance 408 and load impedance 406. The L type attenuator includes resistor 602 connected in parallel with the load impedance between node 601 and ground. FIG. 6-2 also shows a L type attenuator as the connection device 302 incorporated in a differential circuit that uses three resistors 604, 606 and 608 to implement a L type attenuator. Impedance matching is provided by L type attenuators in a manner similar to Pi and T type attenuators.

Figures 1, 7:
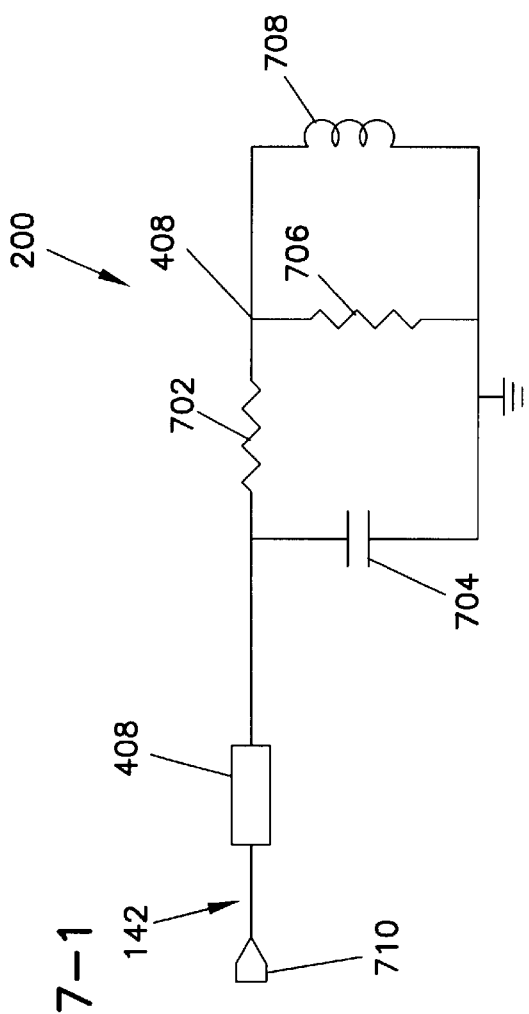

Referring now to FIG. 7-1, a simulation of a head and FOS interconnect path 142 using a simplified impedance model of write circuit 200 (of FIG. 2-1) with no impedance matching is shown. Values of circuit elements of a four element head impedance model 406, source port 710 and interconnect path impedance 408 of a two-inch interconnect path are shown in Table 1 below.

TABLE 1

| CIRCUIT ELEMENT | CIRCUIT ELEMENT VALUE | COMPONENT THAT ELEMENT REPRESENTS |
| --- | --- | --- |
| Resistor 702 | 13.2 ohm | Head |
| Capacitor 704 | 0.5 pF | Head |
| Resistor 206 | 145 ohm | Head |
| Inductor 708 | 16.7 nH | Head |
| Impedance 408 | 100 ohm | Interconnect path |
| Impedance 710 | 50 ohm | Signal source |

Referring now to FIG. 7-2, fourth impedance plot 172 of impedance looking through FOS interconnect path 142 of FIG. 7-1 is shown. This plot is substantially similar to second impedance plot 214 of FIG. 2-3. The frequency range (30 KHz to 2 GHz) over which impedance measurements are made for fourth impedance plot 712 is the same as the frequency range used to obtain second impedance plot 214 of FIG. 2-3. The reason for the observable differences between the model fourth impedance plot 712 and second impedance plot 214 that shows the actual measurement is that the actual measurement includes the effect of flexure spring whereas the model omits this effect on impedance and is otherwise simplified.

Figures 1, 8:
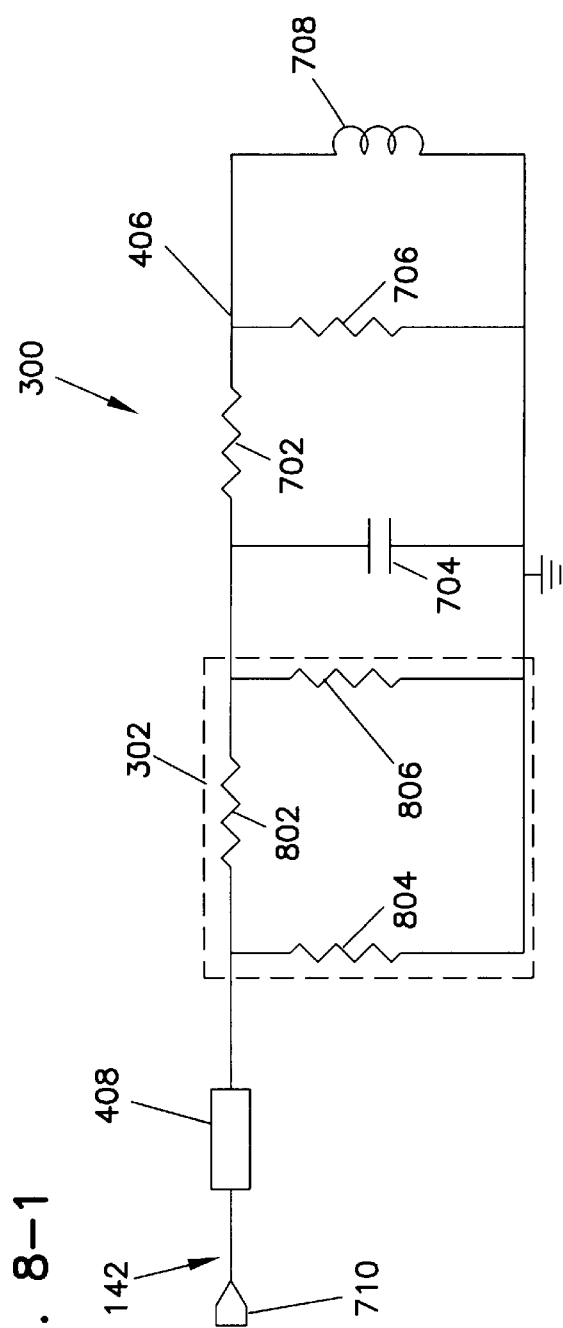
Figures 2, 7:
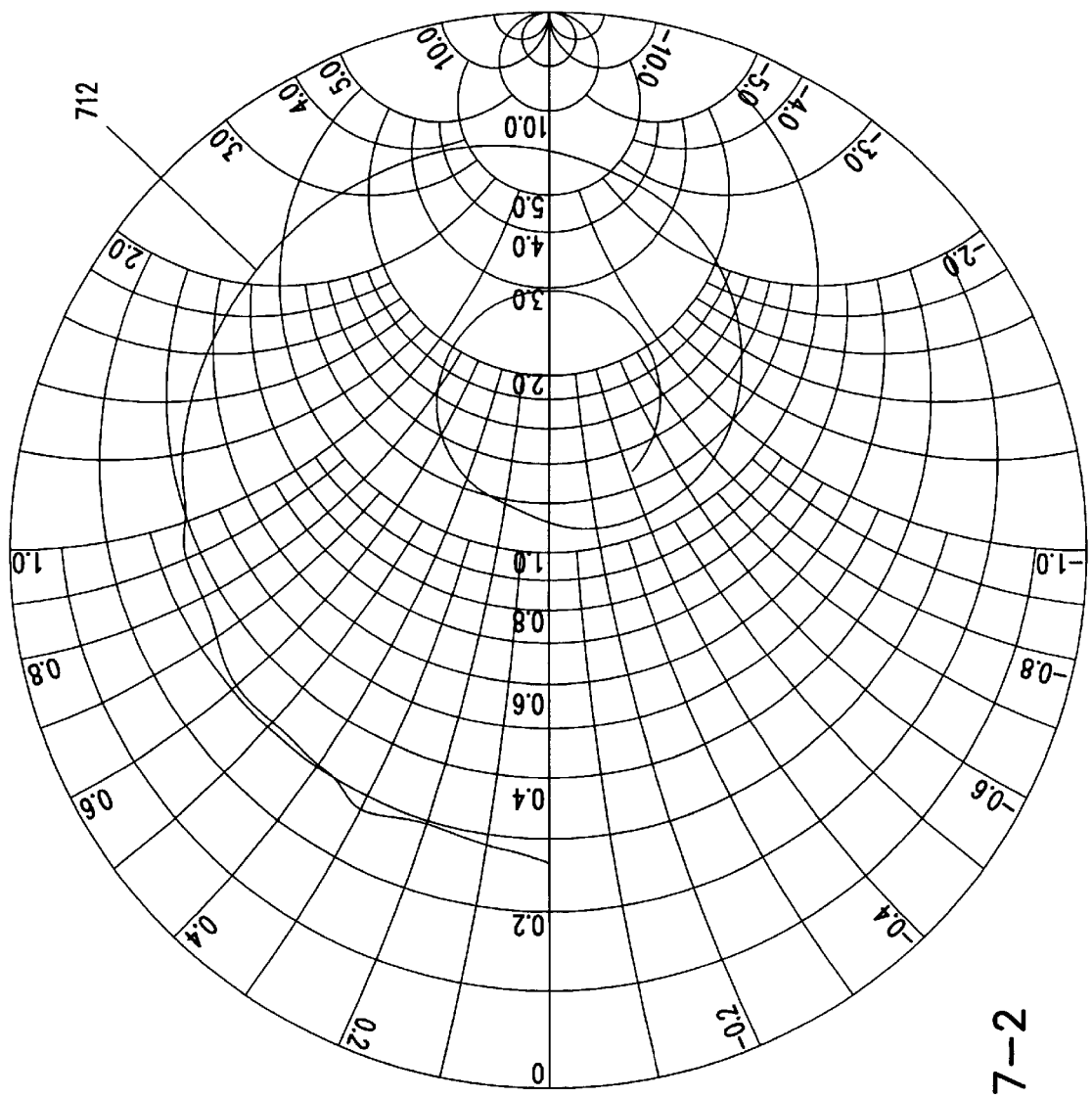
Figures 2, 8:
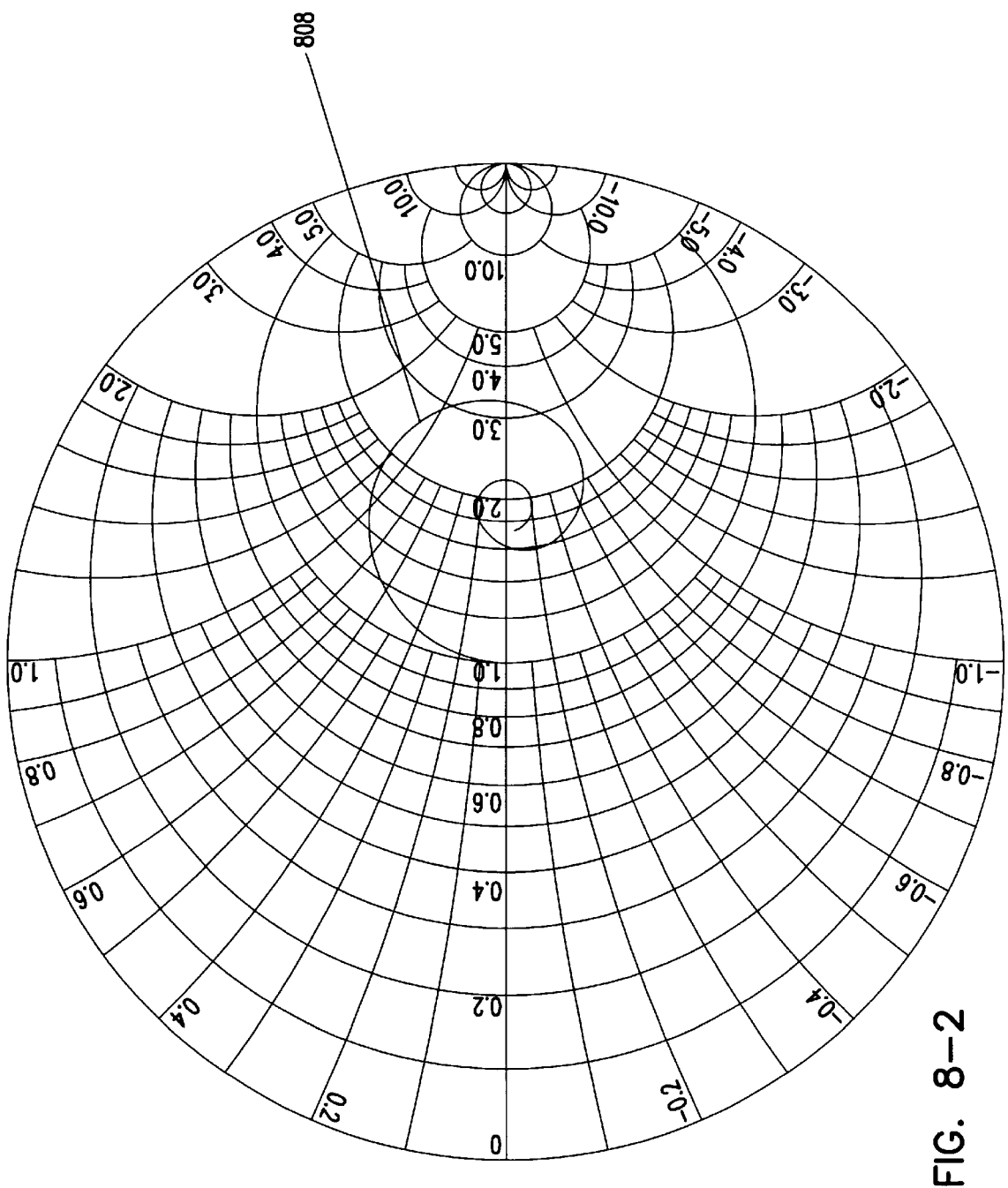

Referring now to FIG. 8-1, a simplified model of matched write circuit 300 with a −3 dB attenuator included in the FOS interconnect path is shown. A Pi type attenuator with a 100 ohm to 120 ohm match built in is used as connection device 302. Details of a Pi type attenuator connection are included above in the description of FIG. 4-1. Values of resistors that are used in the Pi type attenuator of this embodiment and are shown in Table 2 below. Other elements in FIG. 8-1 have the same values as the elements in Table 1 above.

TABLE 2

| CIRCUIT ELEMENT | CIRCUIT ELEMENT VALUE |
| --- | --- |
| Resistor 802 | 50 ohm |
| Resistor 804 | 245 ohm |
| Resistor 806 | 39600 ohm |

Referring now to FIG. 8-2, a fifth impedance plot 808 of impedance looking through FOS interconnect path 142 of FIG. 8-1 is shown. Fifth impedance plot 808 shows a substantial reduction in the size of VSWR characteristics as compared with fourth impedance plot 712 for the same frequency range of 30 KHz to 2 GHz. Therefore, the introduction of the −3 dB attenuator in interconnect path 142 has substantially improved the bandwidth of write circuit 200.

Figures 1, 9:
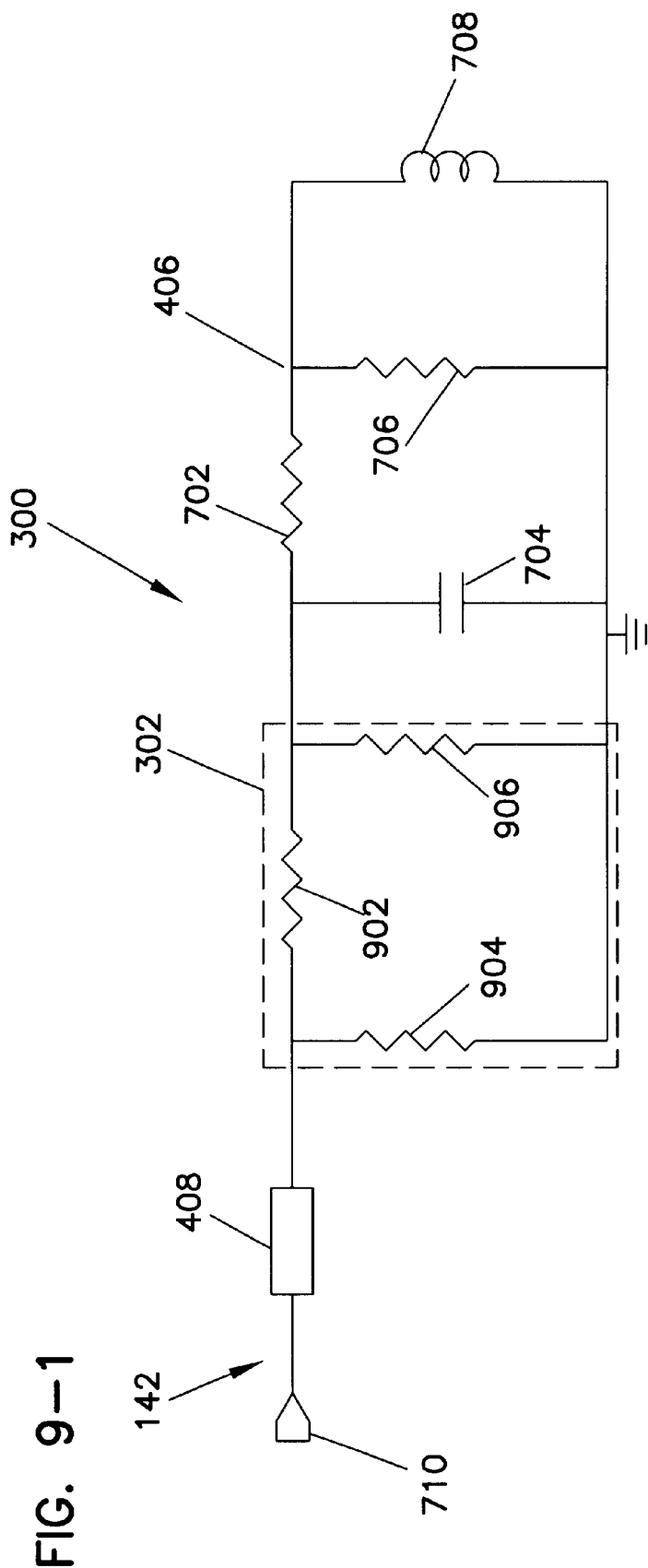
Figures 2, 9:
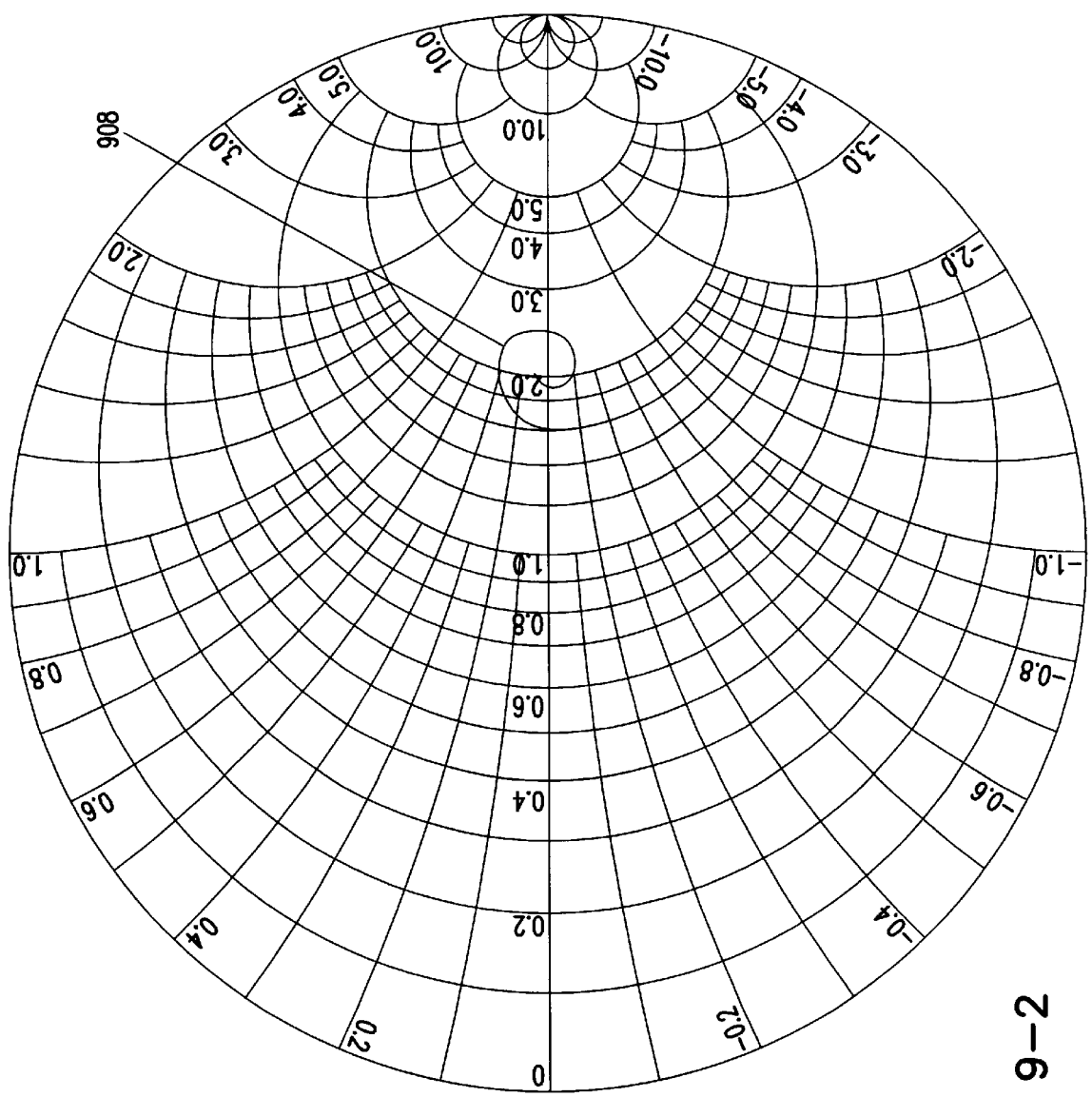

Referring now to FIG. 9-1 a simplified model of matched write circuit 300 with a −6 dB attenuator included in FOS interconnect path 142 is shown. A Pi-type attenuator with a 100 ohm to 200 ohm match built in is used as connection device 302. This design requires twice the amount of write current but offers virtually no drive signal distortion. Values of resistors used in the Pi-type attenuator of this embodiment are shown in Table 3 below. Other elements in FIG. 9-1 have the same values as in Table 1 above.

TABLE 3

| CIRCUIT ELEMENT | CIRCUIT ELEMENT VALUE |
| --- | --- |
| Resistor 902 | 175 ohm |
| Resistor 904 | 140 ohm |
| Resistor 906 | 1420 ohm |

Referring now to FIG. 9-2, a sixth impedance plot 908 of impedance looking through the FOS interconnect path of FIG. 9-1 is shown. The VSWR circle is even smaller than the fifth impedance plot 808 of FIG. 8-2. The smaller the plot, the lower the VSWR and the better the impedance match. Since sixth impedance plot 908 is smaller than fifth impedance plot 808 for the same frequency range of 30 KHz to 2 GHz, the −6 dB attenuator provides an impedance match which is similar to third impedance plot 216 of FIG. 2-4 that shows ideal termination of FOS interconnect path 142.

In addition to the above embodiments described, other components such as transformers, for example, can also be used as connection device 302 to achieve impedance matching. Similarly, signal source 114 can also be adapted to provide a drive signal to magnetize disc 202 in a direction perpendicular to the disc surface (perpendicular recording) which has an advantage of requiring less write current than other recording methods such as longitudinal recording.

The present invention can be summarized in reference to the FIGS., which illustrate disc drive 100 and various embodiments of connection device 302 included in matched write circuit 300. The disc drive storage system includes a rotating disc 202 having a disc surface and a transducer head 206 that writes on the disc surface. Write head or transducer head 206 has a first impedance. A signal source 114 provides a drive signal to write head 206. Signal source 114 has a second impedance. The first and second impedance is mismatched. An electrical interconnect path 142 couples write head 206 and signal source 114. A connection device 302 is included in interconnect path 142 to reduce distortion in the drive signal due to mismatch between the first impedance and the second impedance. In one aspect, the connection device can be any device which has electrical properties to reduce distortion due to signal mismatch between the first impedance and the second impedance such as a length with resistance, inductance, capacitance or other elements such as transformers or even active elements.

In embodiments of the present invention, signal source 114 includes a write amplifier 140 electrically coupled by interconnect path 142 to write head 206. Write amplifier 140 provides increased amplitude for the signal waveform. In some embodiments, interconnect path 142 includes a FOS that couples write amplifier 140 to write head 206.

In some embodiments of the present invention, connection device 302 includes a resistive signal attenuator. Several embodiments of the resistive signal attenuators are provided, such as, a Pi type interconnection of resistors (FIGS. 4-1 and 4-2), a T type interconnection of resistors (FIGS. 5-1 and 5-2) and an L type interconnection of resistors (FIGS. 6-1 and 6-2). An embodiment of the invention also includes a transformer as connection device 302.

In some embodiments, signal source 114 and electrical interconnect path 142 are configured to provide a single-ended input circuit for write head 206, and in others signal source 114 and electrical interconnect path 142 are configured to provide a differential input circuit for write head 206.

In some embodiments, signal source 114 is configured to provide a drive signal to write head 206 to magnetize disc 202 in a direction perpendicular to the disc surface.

Embodiments of the present invention include a method of coupling a signal source 204 to a write head 206 in a disc drive storage system. The method includes providing a drive signal to write head 206 through an electrical interconnect path 142 that electrically couples signal source 204 to write head 206. The method also includes introducing a connection device 302 in electrical interconnect path 142 to reduce distortion in the drive signal due to mismatch between a first impedance of the write head and a second impedance of the signal source.

In some embodiments, introducing connection device 302 includes introducing a resistive signal attenuator into the electrical interconnect path. The resistive signal attenuator can be formed by a Pi type interconnection of resistors, a T type interconnection of resistors or an L type interconnection of resistors. In some embodiments, introducing connection device 302 includes introducing a transformer into the electrical interconnect path.

Some embodiments include configuring the signal source and the electrical interconnect path to provide a single-ended input circuit for write head 206, and others include configuring the signal source and the electrical interconnect path to provide a differential input circuit for write head 206.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the write circuit while maintaining substantially the same functionality without departing from the scope and spirit of the present invention. Although the invention has been described in terms of flex-on suspension, the invention is applicable to any technique in which electrical conductors run along a disc suspension and couple to a head. In addition, although the preferred embodiment described herein is directed to a frequency range extension method and apparatus for a disc drive system, it will be appreciated by those skilled in the art that the teachings of the present invention can be applied to other systems involving signal transmission without departing from the scope and spirit of the present invention.

What is claimed is:

1. An apparatus comprising:
   a write head configured to write on a data storage surface, the write head having a first impedance;
   a signal source configured to provide a drive signal to the write head, the signal source having a second impedance, wherein the first impedance and the second impedance are mismatched;

an electrical interconnect path coupled between the write head and the signal source; and a connection device, which includes a resistive signal attenuator, in the interconnect path configured to reduce distortion in the drive signal due to mismatch between the first impedance and the second impedance.

2. The apparatus of claim 1, wherein the signal source includes a write amplifier circuit electrically coupled by the electrical interconnect path to the write head, the write amplifier circuit provides an increase in amplitude for the signal waveform.

3. The apparatus of claim 1, wherein the interconnect path includes a flex circuit coupling the signal source to the write head.

4. The apparatus of claim 1, wherein the resistive signal attenuator includes a Pi type interconnection of resistors.

5. The apparatus of claim 1, wherein the resistive signal attenuator includes a T type interconnection of resistors.

6. The apparatus of claim 1, wherein the resistive signal attenuator includes an L type interconnection of resistors.

7. The apparatus of claim 1, wherein the signal source and the electrical interconnect path are configured to provide a single-ended input circuit for the write head.

8. The apparatus of claim 1, wherein the signal source and the electrical interconnect path are configured to provide a differential input circuit for the write head.

9. The apparatus of claim 1, wherein the signal source is configured to provide a drive signal to the write head to magnetize the data storage surface in a direction perpendicular to the data storage surface.

10. A method of coupling a signal source to a write head, the method comprising:

(a) providing a drive signal to the write head through an electrical interconnect path that electrically couples the signal source to the write head; and (b) introducing a connection device, which includes a resistive signal attenuator, in the electrical interconnect path to reduce distortion in the drive signal due to mismatch between a first impedance of the write head and a second impedance of the signal source.

11. The method of claim 10, comprising forming the resistive signal attenuator with a Pi type interconnection of resistors.

12. The method of claim 10, comprising forming the resistive signal attenuator with a T type interconnection of resistors.

13. The method of claim 10, comprising forming the resistive signal attenuator with an L type interconnection of resistors.

14. The method of claim 10, comprising configuring the signal source and the electrical interconnect path to provide a single-ended input circuit for the write head.

15. The method of claim 10, comprising configuring the signal source and the electrical interconnect path to provide a differential input circuit for the write head.

16. A disc drive storage system for storing information on a surface of a rotatable disc, comprising:

an electrical interconnect path that couples a write head having a first impedance to a signal source having a second impedance; and in the electrical interconnect path, connection device means for reducing distortion in a drive signal, provided by the signal source to the write head, due to mismatch between the first impedance and the second impedance.

* * * * *

UNITED STATES PATENT AND TRADEMARK OFFICE
CERTIFICATE OF CORRECTION

PATENT NO. : 6,728,057 B2
DATED : April 27, 2004
INVENTOR(S) : John S. Putnam

It is certified that error appears in the above-identified patent and that said Letters Patent is hereby corrected as shown below:

Column 6,
Table 1, column 1, row three, replace "Resistor 206" with -- Resistor 706 --.

Signed and Sealed this

Twenty-second Day of November, 2005

JON W. DUDAS
*Director of the United States Patent and Trademark Office*